United States Patent [19]

Sowell

[11] Patent Number: 4,719,850
[45] Date of Patent: Jan. 19, 1988

[54] AUTOMATIC COOKING APPARATUS

[76] Inventor: Jerry G. Sowell, Rt. 1, Oakfield, Tenn. 38362

[21] Appl. No.: 940,913

[22] Filed: Dec. 12, 1986

[51] Int. Cl.⁴ ............................................... A47J 37/12
[52] U.S. Cl. ....................................... 99/404; 99/407
[58] Field of Search ................ 99/403, 404, 407, 408, 99/410

[56] References Cited

U.S. PATENT DOCUMENTS

| | | | |
|---|---|---|---|
| 1,630,676 | 5/1927 | Smith | 99/404 |
| 2,614,485 | 10/1952 | Sinkwitz et al. | 99/404 |
| 2,616,359 | 11/1952 | Pierson | 99/404 |
| 3,036,513 | 5/1962 | Reeves | 99/404 |
| 3,635,148 | 1/1972 | Fenerli | 99/407 |
| 3,645,196 | 2/1972 | Johnston et al. | 99/407 |

Primary Examiner—Henry S. Jaudon
Attorney, Agent, or Firm—Walker & McKenzie

[57] ABSTRACT

An apparatus for automatically deep-fat frying food products. A vat containing cooking medium is associated with a heater for heating the cooking medium. A plurality of baskets for containing food products are pivotally mounted on a spider-like hub member for movement between cooking and discharge positions. A drive mechanism is coupled to the hub member for rotating the hub member and the baskets. A cam mechanism is associated with the baskets and the vat for moving the baskets between the cooking and discharge positions as the baskets are rotated about the vat.

8 Claims, 11 Drawing Figures

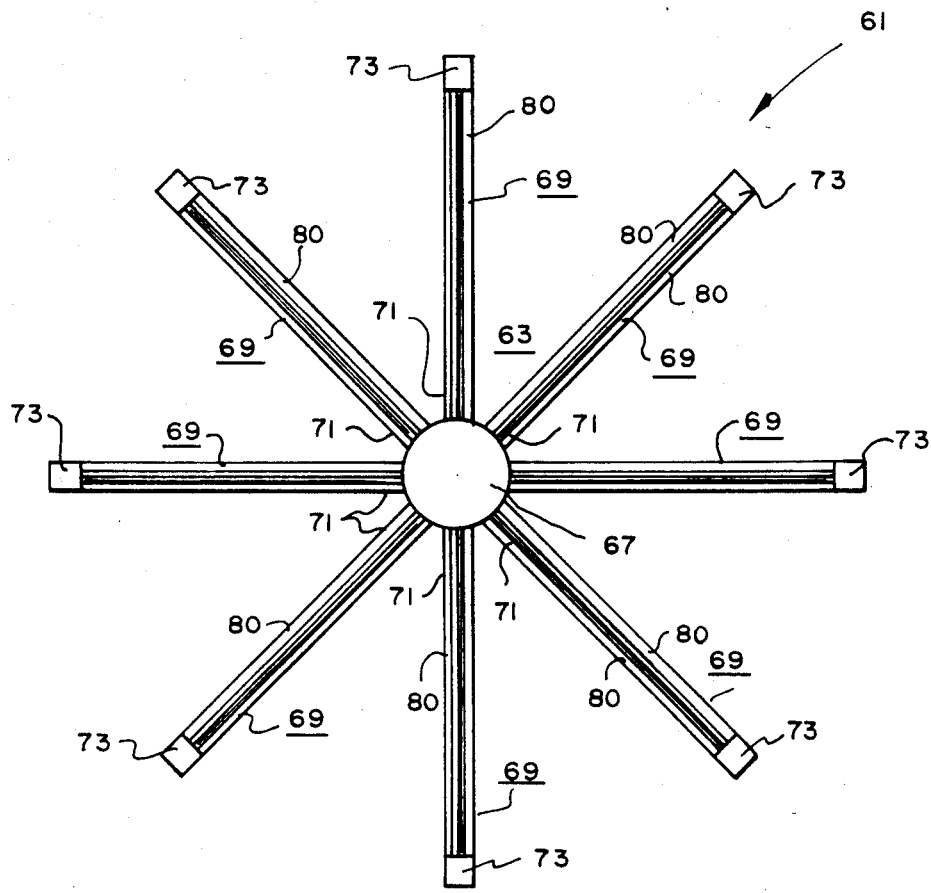
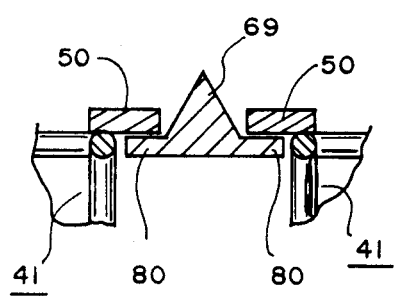
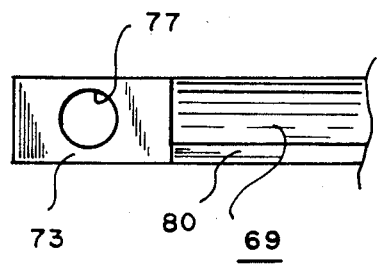

AUTOMATIC COOKING APPARATUS

BACKGROUND OF THE INVENTION

1. Field of the Invention

The present invention related in general to automatic deep fat fryers and the like.

2. Description of the Related Art

Various automatic deep fat fryers and the like have heretofore been developed. A preliminary patentability search in class 99, subclasses 404, 407 and 410 disclosed the following patents: Brunner, U.S. Pat. No. 1,472,205; Cicero et al, U.S. Pat. No. 2,010, 219; Reeves, U.S. Pat. No. 3,036,513; Haub et al, U.S Pat. No. 3,296,954; Kocken et al, 3,357,341; Dexters, U.S. Pat. No. 3,448,677; Curtin, U.S. Pat. No. 3,474,726; Fenerli, U.S. Pat. No. 3,635,148; Johnston et al, U.S. Pat. No. 3,645,196; Morley, U.S. Pat. No. 3,908,531; Garrett, U.S. Pat. No. 4,205,600; and Barber et al, U.S. Pat. No. 4,224,863. None of the above patents disclose or suggest the present invention.

SUMMARY OF THE INVENTION

The present invention is directed toward providing an improved automatic cooking apparatus. The concept of the present invention is to provide a cooking apparatus of simple construction which will automatically cook food products in a liquid cooking medium.

The cooking apparatus of the present invention comprises in general a vat containing a cooking medium; heater means associated with the vat for heating the cooking medium within the vat; a plurality of baskets disposed at least partially within the vat for holding food items to be cooked; drive means for selectively rotating the baskets within the vat, the drive means including rotatable hub means coupled to the baskets to cause the baskets to rotate within the vat, the hub means having a hub shaft member for extending through a hollow column member of the vat and having a plurality of radially extending spoke members attached to the upper end of the hub shaft member with each of the baskets being pivotally attached to the outer end of at least one of the spoke members; and cam means associated with the baskets for causing the baskets to move between cooking and discharge positions as they are rotated within the vat.

BRIEF DESCRIPTION OF THE DRAWINGS

FIG. 3 is a top plan view of the hub means of the cooking apparatus of the present invention.

FIG. 4 is an enlarged sectional view substantially as taken on line IV—IV of FIG. 1.

FIG. 5 is an enlarged elevational view of the outer end of one spoke member of the hub means shown in FIG. 3.

DESCRIPTION OF THE PREFERRED EMBODIMENT

The preferred embodiment of the automatic cooking apparatus 11 of the present invention is for cooking food items or products 13 in fast food restaurants and the like. The food products 13 may consist of any typically deep fat fried food such as potatoes, fish, etc.

Figure 6:
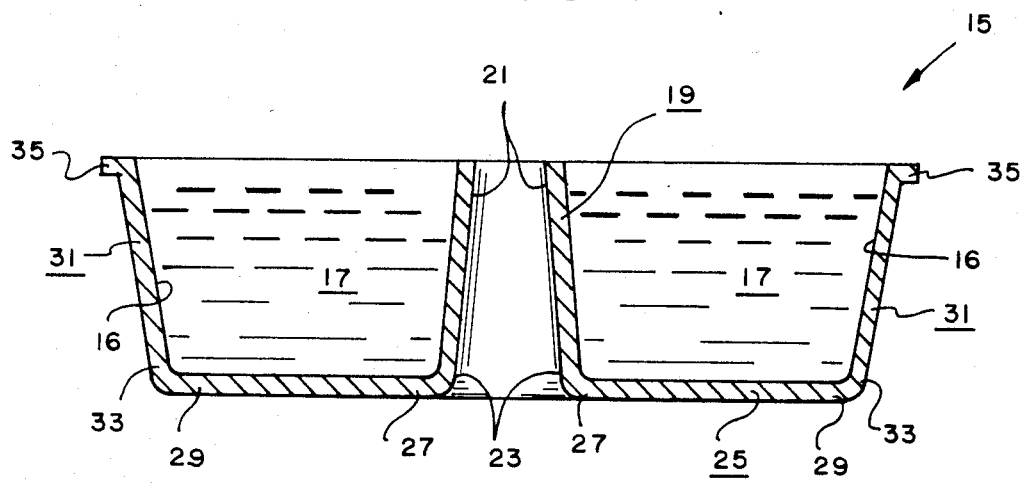
FIG. 6 is a sectional view of the vat of the cooking apparatus of the present invention.
Figure 7:
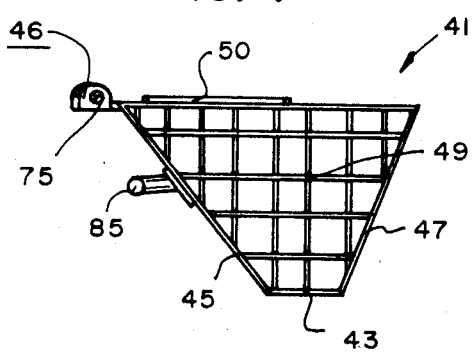
FIG. 7 is a side elevational view of one of the baskets of the cooking apparatus of the present invention.
Figure 8:
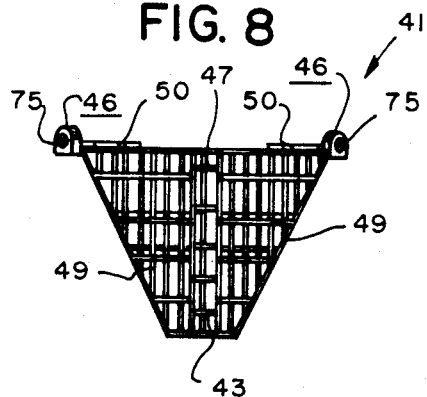
FIG. 8 is a front elevational view of the basket of FIG. 7.
Figure 9:
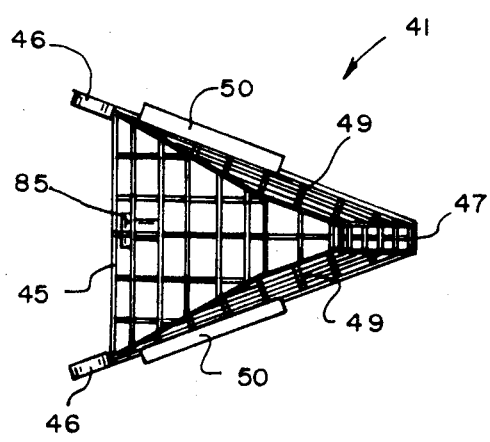
FIG. 9 is a top plan view of the basket of FIG. 7.
Figure 10:
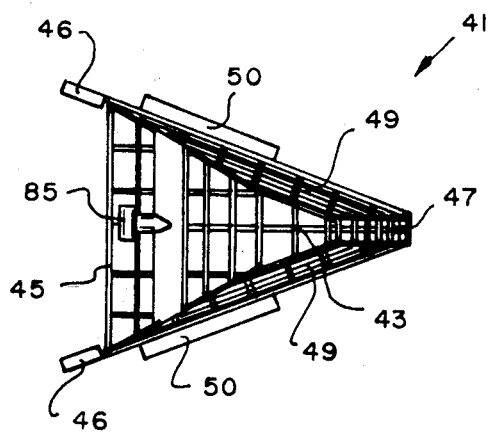
FIG. 10 is a bottom plan view of the basket of FIG. 7.

The cooking apparatus 11 includes a vat 15 (see, in general, FIGS. 2 and 6) having an interior 16 containing a cooking medium 17 such as cooking oil, etc. The vat 15 includes a hollow column member 19 having an upper end 21 and a lower end 23. The column member 19 may be narrower at the upper end 21 than at the lower end 23 to reduce the amount of cooking medium 17 required to fill the vat 15, etc. The vat 15 includes a substantially flat bottom member 25 having an inner edge 27 attached to the lower end 23 of the column member 19 and having an outer edge 29. The vat 15 includes a side wall 31 having a lower end 33 attached to the outer edge 29 of the bottom member 25 and having an upper end 35. The vat 15 may be constructed in various sizes, etc., in any manner now apparent to those skilled in the art.

Figure 1:
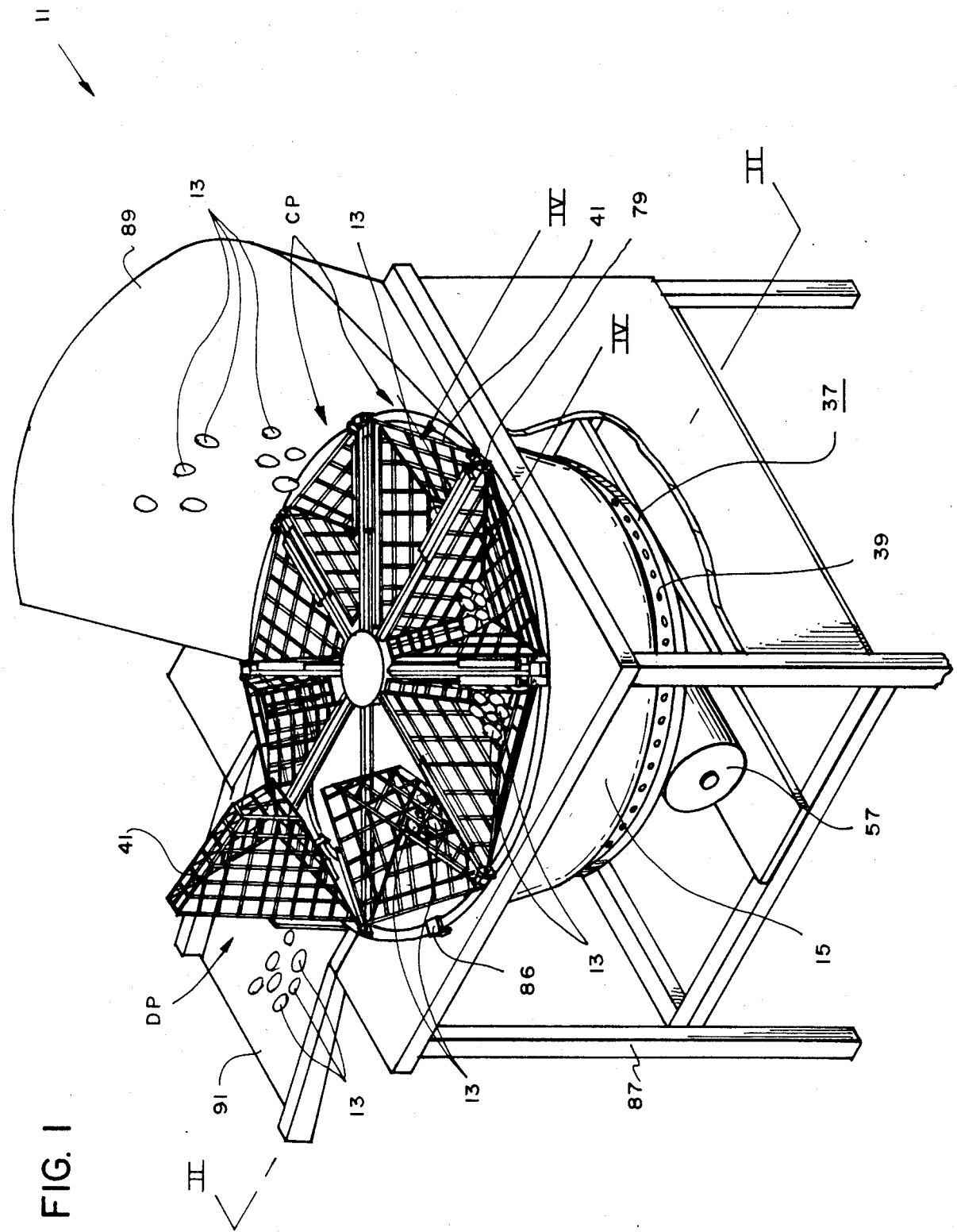
FIG. 1 is a perspective view of the preferred embodiment of the cooking apparatus of the present invention.

The cooking apparatus 11 includes a heater means 37 associated with the vat 15 (see FIGS. 1 and 2) for heating the cooking medium 17 within the vat 15. The heater means 37 may consist of any typical heater means now apparent to those skilled in the art for heating cooking oil, etc. Thus, the heater means 37 may include a typical ring-type gas burner 39 for being positioned directly beneath the bottom member 25 of the vat 15 and associated structure (not shown) for allowing the gas burner 39 to provide a flame to heat the cooking medium 17 within the vat 15 as will now be apparent to those skilled in the art.

The cooking apparatus 11 includes a plurality of baskets 41 (see, in general, FIGS. 7-10) for containing the food products 13 to be cooked with each basket 41 movable (see FIGS. 1 and 2) between a cooking position located at least partially within the interior 16 of the vat 15 as indicated by the arrow CP and a discharge position located at least partially out of the interior 16 of the vat 15 as indicated by the arrow DP. Each basket 41 preferably includes a substantially flat bottom 43, a first end wall 45 extending upwardly from the front of the bottom 43, ears 46 attached to the opposite sides of the upper end of the first end wall 45, a second end wall 47 extending upwardly from the rear of the bottom 43, a pair of side walls 49 extending upwardly from the opposite sides of the bottom 43 and joined at the opposite ends to the respective front and rear walls 45, 47, and a tang member 50 attached to the upper edge of each side wall 49 to thereby form an opened top container (see, in general, FIGS. 7-10). The bottom 43 and walls 45, 47, 49 are preferably constructed of any typical open screen material known to those skilled in the art for use in deep fat cooking operations and the like. Each basket 41 may include a skeletal framework of rigid metal or the like with the ears 46 and tang members 50 formed as part of the rigid skeletal framework. The first end wall 45 is preferably wider than the second end wall 46 whereby each basket 41 is shaped similar to a pie section when viewed from the top or bottom to allow a plurality of the baskets 41 to be arranged in a circular manner about the colummn member 19 of the vat 15 to substantially fill the open top of the vat 15 (see FIG. 1). The first end wall 45 preferably slopes downwardly toward the second end wall 47 and the second end wall 47 preferably slopes downwardly toward the first end wall 45 for reasons which will hereinafter become apparent.

Figure 2:
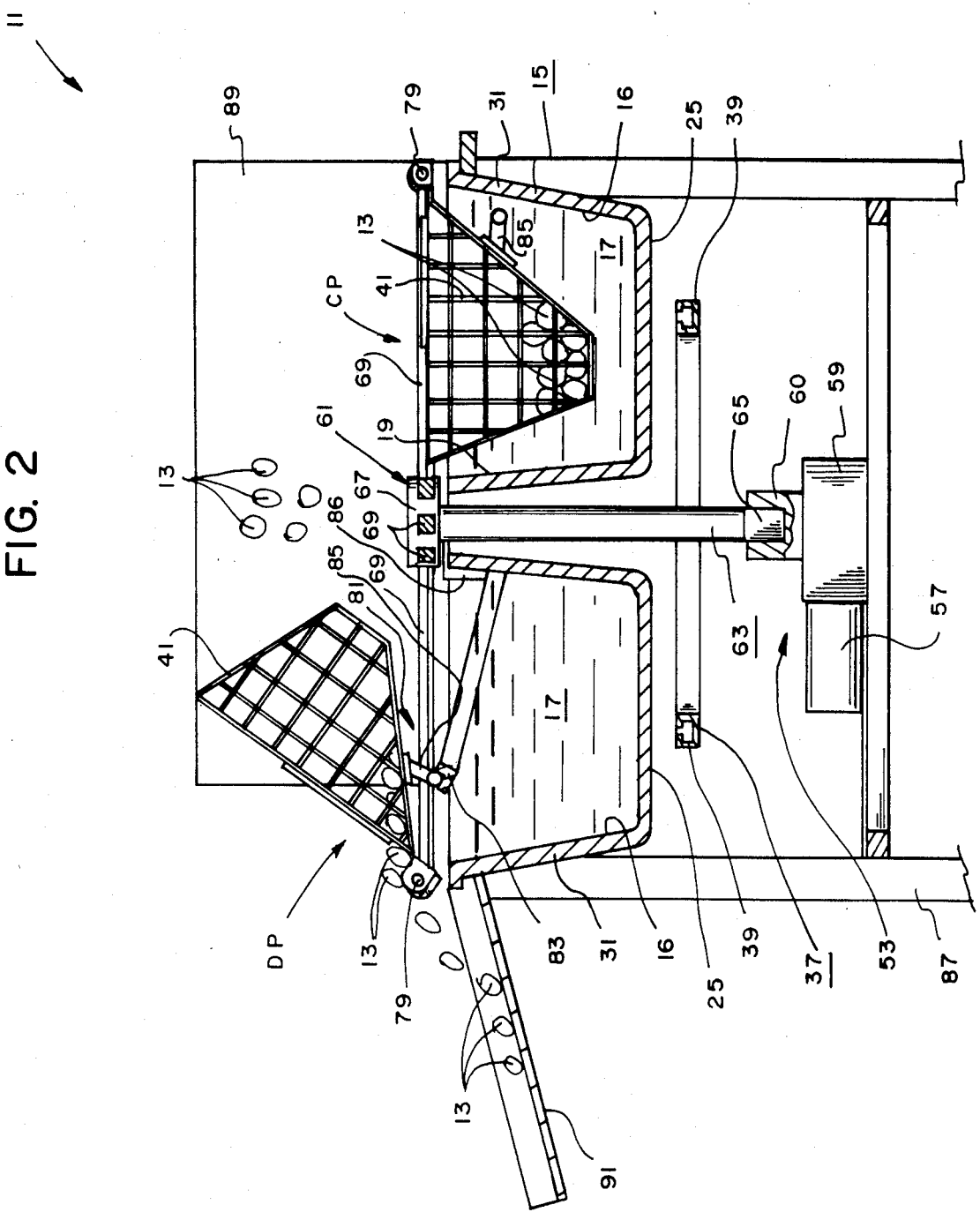
FIG. 2 is a sectional view substantially as taken on line II—II of FIG. 1.

The apparatus 11 includes drive means 53 for selectively rotating the baskets 41 within the vat 15 (see, in general, FIG. 2). The drive means 53 preferably includes a substantially standard electric motor 57 coupled to a substantially standard transmission 59 having an output or drive shaft 60.

The drive means 53 includes hub means 61 (see, in general, FIGS. 2 and 3) coupled to the drive shaft 60 of the transmission 59 and to the baskets 41 for being rotated by the drive means 53 and for, in turn, rotating the baskets 41. The hub means 61 preferably includes an elongated hub shaft 63 for extending through the column member 19 of the vat 15. The hub shaft 63 has a first end 65 for being removably coupled to the drive shaft 60 of the transmission 59 and a second end 67 for being located adjacent the upper end 21 of the column member 19. The hub means 61 includes a plurality of elongated spoke members 69 extending radially outward from the first end 65 of the hub shaft 63. More specifically, each spoke member 69 has an inner end 71 attached to the first end 65 of the hub shaft 63 and an outer end 73. Each basket 41 is preferably pivotally attached to the outer end 73 of at least one of the spoke members 69 for pivotal movement between the cooking position CP and the discharge position DP. More specifically, each ear 46 of each basket 41 preferably has a transverse aperture 75 therethrough (see FIGS. 7 and 8), each outer end 73 of each spoke member 69 preferably has a transverse aperture 77 therethrough (see FIG. 5), and the apparatus 11 preferably includes a plurality of pivot pins 79 (see, FIGS. 1 and 2) for extending through adjacent apertures 75, 77 to removably and pivotally attach the baskets 41 to the outer ends 73 of the spoke members 69 as will now be apparent to those skilled in the art. Flanges 80 are preferably provided on each spoke member 69 for coacting with the tang members 50 of each basket 41 to help support the baskets 41 in the cook positions CP (see, in general, FIG. 4).

Figure 11:
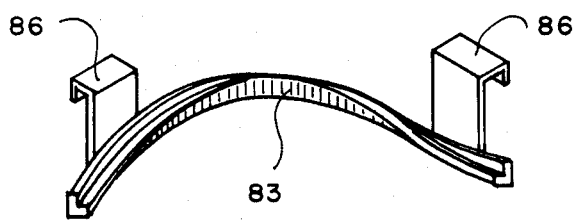
FIG. 11 is a perspective view of the cam member of the cooking apparatus of the present invention.

The apparatus 11 includes cam means 81 (see FIGS. 2 and 11) associated with the baskets 41 (see FIG. 2) for causing the baskets 41 to move between the cooking and discharge positions as the baskets 41 rotate about the column member 19. The cam means 81 preferably includes a cam member 83 attached to the vat 15 and a cam follower member 85 attached to each basket 41 so that rotation of the baskets 41 about the column member 19 of the vat 15 will cause the baskets 41 to move between the down or cooking position CP and the up or discharge position DP. The cam member 83 is preferably movably attached to the upper end 35 of the side wall 31 of the vat 15 by hangers 86 or the like for allowing the specific location of the raising and lowering of the baskets 41 to be varied depending on the type food product 13 being cooked, etc.

The apparatus 11 preferably includes frame means 87 (see FIGS. 1 and 2) for supporting the various components thereof. The frame means 87 may be of any typical construction now apparent to those skilled in the art. Thus, the frame means 87 may consist of a substantially open table-like structure adapted to securely receive the various components as will now be apparent to those skilled in the art.

The apparatus 11 preferably includes a loading chute member 89 (see FIGS. 1 and 2) attached to the frame means 87 for allowing food products 13 to be easily loaded into the baskets 41 and a discharge chute member 91 (see FIGS. 1 and 2) attached to the frame means 87 for allowing food products 13 to be easily discharged from the baskets 41 into a holding means or the like (not shown). The loading and discharge chute members 89, 91 may be constructed in various shapes and sizes, etc., as will now be apparent to those skilled in the art. The loading and discharge chute members 89, 91 are preferably movable on the frame means 89 about the vat 15 to allow the cooling cycle, etc., of the cooking apparatus 11 to be easily varied.

The specific construction and operation of the apparatus 11 may vary as will now be apparent to those skilled in the art. Thus, for example, the vat 15, baskets 41, hub means 61, cam means 81, frame means 77, loading chute member 89 and discharge chute member 91 may be constructed out of stainless steel in any manner now apparent to those skilled in the art and the drive means 53 may be controlled automatically by computer means or the like (not shown) to allow the speed of rotation of the drive shaft 60 and, therefore, the baskets 41 to be varied depending on the specific food products 13 being cooked, etc.

The basic operation of the apparatus 11 is quite simple. With the drive means 53 activated for a specific food product 13 such as french fries, the raw food products 13 are merely placed on the loading chute member 89. lhe raw food products 13 will then slide down the loading chute member 89 into one or more baskets 41. Because of the triangular cross sectional shape of the spoke members 69, (see FIG. 4) any of the food products 13 that slide down the loading chute member 89 between two adjacent baskets 41 will fall off the spoke member 69 into one of the adjacent baskets 41. As the baskets 41 rotate, the cam means 81 will cause consecutive ones of the baskets 41 to raise from the cooking position CP to the discharge position DP and to dump the food products 13 therefrom onto the discharge chute member 91.

The apparatus 11 thus provides a deep fat fryer-type cooker which allows food products to be inserted or removed at any point in the cooking cycle; allows two or more food products to be properly cooked at the same time by merely placing different food products in different baskets 41 at different points in the cooking cycle; allows food products to be placed on the loading chute member 89 without worry as to the specific location of the baskets 41 since the food products will slide into one of the adjacent baskets 41; allows individual baskets 41 to be changed if necessary by the removal of two pivot pins 79; allows the loading and discharge locations to be easily adjusted by merely moving the cam member 83, loading chute member 89 and the discharge chute member 91 about the vat 15; and which can be set for different operating speeds for accommodating slow and fast periods, etc.

The appartus 11 is designed with a minimum number of moving parts and no complex components so as to reduce the chance of mechanical problems. In the event of mechanical problems, the hub means 61 can be removed from the remainder of the apparatus 11 by merely lifting the hub means 61 straight up, and the vat 15 can be used as a manual cooker with baskets adapted to fit onto the upper edges of the vat 15 as will now be apparent to those skilled in the art. The drive means 53 can be then removed for repair, etc.

Although the present invention has been described and illustrated with respect to a preferred embodiment and use, it is not to be so limited since changes and modifications can be made therein which are within the full intended scope thereof.

I claim:

1. An automatic cooking apparatus comprising, in combination:
   a vat having an interior for containing a cooking medium;
   heater means associated with said vat for heating said cooking medium within said vat;
   a plurality of food holding members for holding food products to be cooked, each of said food holding members being movable between a cooking position located at least partially within said interior of said vat and a discharge position located at least partially out of said interior of said vat;
   drive means for rotating said food holding members within said vat, said drive means including hub means coupled to said food holding members, including a motor, said hub means including an elongated hub shaft having a first end operatively coupled to said motor for being rotated thereby and having a second end, and including a plurality of spoke members attached to said second end of said hub shaft and extending radially therefrom, each of said food holding members being movably attached to one end of at least one of said spoke members;
   cam means for causing said food holding members to move between said cooking and discharge positions.

2. An automatic cooking apparatus comprising, in combination:
   a vat having an interior for containing a cooking medium;
   heater means associated with said vat for heating said cooking medium within said vat;
   a plurality of baskets for containing food products to be cooked, each of said baskets being movable between a cooking position located at least partially within said interior of said vat and a discharge position located at least partially out of said interior of said vat;
   drive means for rotating said baskets within said vat, said drive means including a hub means coupled to said baskets, including an electric motor and including a transmission; said hub means including an elongated hub shaft having a first end operatively coupled to said transmission for being rotated thereby and having a second end, and including a purality of spoke members attached to said second end of said hub shaft and extending radially therefrom, each of said baskets being pivotally attached to the outer end of at least one of said spoke members, and
   cam means for causing said baskets to move between said cooking and discharge positions.

3. The apparatus of claim 2 in which each of said baskets includes a bottom, a first end wall, a second end wall, and a pair of side walls joined to one another to form an opened top container.

4. The apparatus of claim 3 in which said vat includes a hollow column member having an upper end and having a lower end, includes a bottom member having an inner edge attached to said lower end of said column member and having an outer edge, and including a side wall having a lower end attached to said outer edge of said bottom member and having an upper end.

5. The apparatus of claim 4 in which said cam means includes a cam member for being secured to said upper end of said side wall of said vat and includes a cam follower member for being secured to each of said baskets.

6. The apparatus of claim 6 in which is included a loading chute member for allowing said food products to be easily loaded into said baskets.

7. The apparatus of claim 6 in which is included a discharge chute member for allowing said food products to be easily discharged from said baskets.

8. The apparatus of claim 7 in which each of the said spoke members is substantially triangular-shaped in cross section to cause any food product that passes from said loading chute member is one of said spoke members to fall off said spoke member into one of said baskets.

* * * * *